US007693798B2

(12) United States Patent
Anderson et al.

(10) Patent No.: US 7,693,798 B2
(45) Date of Patent: Apr. 6, 2010

(54) ANONYMOUS MERCHANDISE DELIVERY SYSTEM

(76) Inventors: Roy L. Anderson, 1433 Dwight Dr., Glendale, CA (US) 91207; Joan M. Ziegler, 2355 Paradise Dr., Tiberon, CA (US) 94920; Jacob Y. Wong, 7110 Georgetown Rd., Goleta, CA (US) 93117

( * ) Notice: Subject to any disclaimer, the term of this patent is extended or adjusted under 35 U.S.C. 154(b) by 1413 days.

(21) Appl. No.: 10/968,402

(22) Filed: Oct. 18, 2004

(65) Prior Publication Data

US 2005/0082362 A1    Apr. 21, 2005

Related U.S. Application Data

(63) Continuation of application No. 09/960,714, filed on Sep. 21, 2001, now Pat. No. 6,805,288, which is a continuation-in-part of application No. 09/667,081, filed on Sep. 21, 2000, now abandoned, and a continuation-in-part of application No. 09/667,089, filed on Sep. 21, 2000, now abandoned, which is a continuation-in-part of application No. 09/659,434, filed on Sep. 8, 2000, now abandoned, which is a continuation-in-part of application No. 09/640,044, filed on Aug. 15, 2000, now abandoned, which is a continuation-in-part of application No. 09/619,859, filed on Jul. 20, 2000, now abandoned, which is a continuation-in-part of application No. 09/571,707, filed on May 15, 2000, now Pat. No. 6,592,044.

(51) Int. Cl.
*G06Q 40/00* (2006.01)

(52) U.S. Cl. .............................. 705/67; 705/26; 705/39; 705/74; 235/380

(58) Field of Classification Search ................... 705/39, 705/16, 18, 26, 67, 74; 235/380, 375
See application file for complete search history.

(56) References Cited

U.S. PATENT DOCUMENTS 5,590,197 A * 12/1996 Chen et al. .................... 705/65
5,708,422 A * 1/1998 Blonder et al. ............. 340/5.41
5,956,699 A * 9/1999 Wong et al. ................... 705/39
6,592,044 B1 * 7/2003 Wong et al. ................. 235/493
6,609,654 B1 * 8/2003 Anderson et al. ........... 235/379
6,755,341 B1 * 6/2004 Wong et al. ................. 235/380
6,938,022 B1 * 8/2005 Singhal ....................... 705/74
6,956,699 B2 * 10/2005 Hong et al. ................. 359/491
7,013,290 B2 * 3/2006 Ananian ..................... 705/27
7,069,249 B2 * 6/2006 Stolfo et al. ................. 705/74
7,181,017 B1 * 2/2007 Nagel et al. ................. 380/282
7,213,748 B2 * 5/2007 Tsuei et al. ................. 235/380
7,225,156 B2 * 5/2007 Fisher et al. ................. 705/50
7,264,152 B2 * 9/2007 Tsuei et al. ................. 235/380
7,454,356 B2 * 11/2008 Fields et al. ................... 705/1

* cited by examiner

*Primary Examiner*—Andrew Joseph Rudy
(74) *Attorney, Agent, or Firm*—Roy L. Anderson; Wagner, Anderson & Bright, LLP

(57) ABSTRACT

A method for implementing an anonymous payment card transaction, in either a face-to-face transaction or a MOTO transaction, in which the user is allowed to select an option for anonymous delivery of goods. The option is conveyed to a money source by means of a customization parameter. The customization parameter is used to customize generation of a user one-time payment card number, to customize a user identifier or as a customization variable that is included in a user transaction data packet which includes the user one-time payment card number and the user identifier. A delivery agent can be used to deliver the purchased goods to a delivery location that is not known by the merchant by use of a tracking identifier provided by the money source to the merchant and the delivery agent. After the purchased goods are delivered by the merchant to the delivery agent, they can be delivered to a destination location and held for pick-up, they can be delivered to a second delivery agent, or they can be delivered to a delivery address provided to the delivery agent. A person receiving the goods can prove entitlement to such goods by presentation of a delivery code or a dummy one-time payment card number that can also serve as proof of receipt and by used to trigger a charge for the goods once they have been received.

21 Claims, No Drawings

ANONYMOUS MERCHANDISE DELIVERY SYSTEM

CROSS REFERENCE TO RELATED APPLICATIONS

The present application is a continuation application of U.S. patent application Ser. No. 09/960,714, filed Sep. 21, 2001, now U.S. Pat. No. 6,805,288 which was a continuation-in-part application of U.S. application Ser. Nos. 09/667,081 and 09/667,089, filed Sep. 21, 2000, now abandoned which are continuation-in-part applications of U.S. Ser. No. 09/659,434, filed Sep. 8, 2000, now abandoned which is a continuation-in-part of U.S. Ser. No. 09/640,044, filed Aug. 15, 2000, now abandoned which is a continuation-in-part of U.S. Ser. No. 09/619,859, filed Jul. 20, 2000, now abandoned which is a continuation-in-part of Ser. No. 09/571,707 filed May 15, 2000 now U.S. Pat. No. 6,592,044, all of which disclosures are specifically incorporated herein by reference. The present application is also related to U.S. patent application Ser. Nos. 09/667,835, 09/667,089, and 09/667,038, all of which were filed on Sep. 21, 2000, and all of which are specifically incorporated herein by reference. The present application continues the subject matter previously set forth in U.S. Ser. No. 09/667,082.

FIELD OF THE INVENTION

The present invention is in the field of methods for making payments through payment cards.

BACKGROUND OF THE INVENTION

Three forms of money in widespread use today throughout the world are cash, checks and payment cards (debit or credit). Each has distinct advantages, and distinct disadvantages. Cash is readily accepted, easy to use and anonymous, but it does not earn interest, it can be lost or stolen, and it is not always readily accessible. Checks are not always accepted, but they offer many advantages, since they do not have to be written until the time of payment. However, they must be physically presented and they are not anonymous. Payment cards are readily, but not always, accepted, and they offer many advantages over checks. If the card is a credit card, payment can be deferred, but the transaction is not anonymous. If the card is a debit card, payment has usually been made prior to its use, but it is anonymous. Accordingly, it is apparent that different types of money have different advantages to different persons in different situations. This may be one reason why all these forms of money are still in widespread use, and are even used by the same persons at different times.

As society and international commerce have become more dependent upon electronic transactions, money has also become more electronic. Many attempts have been made to come up with suitable forms of electronic money that mimic the physical world, or even create new forms of electronic money. However, despite the enormous need for such money, and efforts by some of the best minds and most successful companies in the world, electronic money has suffered many setbacks and been far slower to materialize than many had hoped or predicted. The reasons are many and varied, but some of the obvious reasons are security, ease of use/operation, and unwillingness of the public and/or commerce to make radical changes or embrace new technology and/or procedures. As a result, many efforts, including several potentially promising efforts, have met with failure.

Even though new forms of electronic money have been slow to develop or gain widespread acceptance, electronic payments have still moved forward. Many banks now offer some form of electronic checking. And payment cards have been used for electronic transactions in e-commerce and m-commerce (mobile commerce). Still, there is widespread concern about the safety of such transactions, and recent news stories have uncovered widespread fraudulent activity associated with use of traditional credit card numbers in e-commerce over the Internet. In addition, there is growing concern about consumer privacy, or lack thereof, due to widespread electronic profiling of consumers who make electronic payments.

Although the media has been quick to cover fraud associated with use of credit cards over the Internet, it is often overlooked, at least by the public and the media (but not the credit card companies), that the majority of fraudulent activity concerning credit cards is not associated with e-commerce activity. Most fraud occurs in the "brick and mortar" world, and the numbers are daunting. Despite many attempts to combat unauthorized or fraudulent use of credit cards, it is estimated that credit card fraud now exceeds hundreds of millions, if not several billion, dollars per year. And this does not even count the cost of inconvenience to consumers, merchants and credit card issuer/providers, or the emotional distress caused to victims of such fraud, or the cost to society in terms of law enforcement and preventative activities.

Accordingly, there is a very real, long-felt need to reduce the amount of fraudulent activity that is associated with credit cards, and this need has only grown more acute as consumers and commerce search for better ways to purchase and sell goods and services via e-commerce and m-commerce. However, any solution needs to be something that is acceptable to the public at large. It should be easy to use. It should not be complicated or expensive to implement. Preferably, it should fit within the existing infrastructure, and not be something that requires a great deal of educational effort, or a radical change in behavior or habits of consumers. In other words, it should be user friendly, readily understandable and something that does not require a completely new infrastructure, which is a reason suggested by some as to why smart cards have not been widely accepted in the United States.

In addition, it is highly desirable that any solution to such problems be capable of widespread use, in many different platforms, for many different applications.

In U.S. Pat. No. 5,956,699 issued in September of 1999, Wong and Anderson were the first to introduce the methodology of a system for secure and anonymous credit card transactions on the Internet. This patent introduced a system which used an algorithm to use one's own selected Personal Identification Number or PIN as one's own de facto digital signature. The algorithm instructs the cardholder how to insert one's PIN into one's valid credit card number before using it for any transactions on the Internet. The resultant scrambled up credit card number, which is tailored by the algorithm to having the same number of digits as before, is rendered useless on the Internet because the PIN insertion algorithm is changed automatically after every transaction. This methodology is not only capable of drastically reducing credit card fraud on the Internet, it is also capable of safeguarding one's anonymity, and thus privacy, in credit card purchases on the Internet.

Since the issuance of U.S. Pat. No. 5,956,699, Wong and Anderson have also invented an anonymous electronic card for generating personal Coupons useful in commercial and security transactions, as well as a method for implementing anonymous credit card transactions using a fictitious account name. The present invention is an extension of these prior inventions that seeks to provide a mechanism by which users who desire anonymity can protect that anonymity and still receive delivery of purchased goods in a convenient fashion at any desired location.

SUMMARY OF THE INVENTION

The present invention is generally directed to a method for providing a secure and anonymous transaction between a user and a merchant with subsequent delivery of a purchased item. The user selects a customization parameter at the time of purchase that is used to implement an anonymous delivery method. The customization parameter can be used to customize generation of a user-one time payment card number, a fictitious user identifier or as a customization variable included with the user one-time payment card number and the fictitious user identifier in a transaction data packet provided by the user to the merchant, and ultimately to the money source. After the money source confirms that the transaction is valid and that the user has elected an anonymous delivery option, the money source sends a tracking identifier to the merchant and a delivery agent. Next, the merchant delivers the purchased goods to the delivery agent, and the delivery agent delivers the purchased goods to a delivery address provided by the money source. The merchant need not ever be provided with the delivery address, and the delivery agent need not ever be provided with any details concerning the goods or the transactions.

In a first, separate aspect of the present invention, the party who receives the delivered goods, referred to as an addressee, can be required to establish entitlement to delivery of the purchased goods. The addressee can establish entitlement to delivery by presenting a delivery code or a "dummy" one-time payment card number that is verified as being valid by the money source. If such a "dummy" number is used, it can serve to confirm delivery of the purchased goods.

In another, separate aspect of the present invention, the purchased goods are delivered by the delivery agent to a destination address where they are held for pick-up by an addressee at a pick-up location. Alternatively, the delivery agent delivers the purchased goods to a second delivery agent, and the second delivery agent is provided with the delivery address. Or, in yet another alternative, the goods can be held by the merchant for pick-up by the user or a person authorized by the user to pick-up the goods.

In further, separate aspects of the present invention, confirmation of the validity of a given transaction by the money source can be used as a tracking identifier. The delivery address may be provided by the user in association with selection of the customization parameter, or after the transaction is completed with the merchant, or an independent party acting as a privacy clearinghouse may provide it. The money source can charge or debit the user's account at the time of purchase or after delivery of the goods.

Accordingly, it is a primary object of the present invention to provide a method for allowing a user to conduct an anonymous payment card transaction and receive delivery of goods anonymously.

This and further objects and advantages will be apparent to those skilled in the art in connection with the detailed description of the preferred embodiments set forth below.

DETAILED DESCRIPTION OF THE PREFERRED EMBODIMENTS

The present invention is related to U.S. Pat. Nos. 5913,203, 5,937,394 and 5,956,699, the disclosures of which are all specifically incorporated herein by reference.

The present invention is an extension of the methodology set forth in U.S. application Ser. No. 09/619859 filed Jul. 20, 2000 for Method for Implementing Anonymous Credit Card Transactions Using a Fictitious Account. That application explained how anonymous credit card transactions can be implemented between a user and a merchant through use of an electronic card. Before such a transaction can take place, a user must establish a user account with a money source. The user account is associated with a fictitious name, a user account number and a user settlement mechanism through which the user and the money source can settle transactions involving the user account. In addition, a "Proxy Agent," which is a fictitious address, can be used to conceal the cardholder's actual address and still comply with current credit card transaction regulations. Security and privacy is provided by shielding the true identity of the user and the account number and, when necessary, the true address of the user. This is done by generating a personal charge number, that varies with each transaction, that can be given to a merchant along with the fictitious name and, when necessary, the Proxy Agent. The preferred embodiments extend this methodology by providing methods by which the user can not only purchase goods anonymously, but also receive them anonymously as well.

In the context of the present invention, the user is provided with a card number generator that generates a one-time payment card number. In the context of this description, a one-time payment card number refers to a payment card number of either a credit or a debit card that is useful in financial transactions in the same fashion as a traditional payment card number.

Like a traditional payment card number, a one-time payment card number should be capable of being read by a standard magnetic stripe reader when it is part of a physical card used in traditional face-to-face transactions in which a user presents the physical card to a merchant for payment. However, like traditional payment card numbers, a one-time payment card number should also be capable of being used in a Mail Order Telephone Order ("MOTO") credit card transaction between the user and a merchant. Thus, like a traditional payment card number, the one-time payment card number should fit within, and work with, present platforms and protocols for financial transactions involving payment cards, such as traditional credit cards. This versatility allows the one-time payment card number to be used with electronic cards, software programs used in network applications, or telephones (especially telephones used in what is now being referred to as m-commerce, or mobile commerce).

A traditional payment card number can be characterized as having three parts. First, there is a set of fixed variables. This contains numerals that represent certain specified data fields, such as a bank identifier and a month and year expiration date for a given payment card. (The "bank" may be any "money source" as that term has been defined in U.S. Pat. No. 5,937,394.) Second, there is a set of variable variables. This contains numerals that will vary for different payment cards issued by the same money source. In other words, this is the portion of the card number that will be specific to an individual entity or account for a given issuing money source. Third, there is a check sum bit. The check sum bit functions as a check sum and its value is dictated by the other numerals in the card number.

In the context of the present invention, a user one-time payment card number is akin to a traditional payment card number, with certain exceptions. In a traditional payment card number, there might be a set of six fixed variables, followed by a set of nine variable variables, followed by a check sum bit and another set of four fixed variables representing the month and year. When a user uses this traditional payment card number to complete a given financial transaction, using the same twenty digits for the payment card number always completes the transaction. By contrast, if the user uses a one-time payment card number to complete any such given financial transaction, the transaction will not be completed by always using the same twenty digits for the payment card number. Instead, the twenty digits of the one-time payment card number will vary, and the degree to which they vary may depend upon user selection of a customization parameter. In addition, because the one-time payment card number varies with successive usage, the check sum bit will not necessarily be the same with successive usage, although it may be. Thus, the check sum bit must be recalculated for each new one-time payment card number, and this is why it shall be referred to as a "check sum variable" in the context of a one-time payment card number according to the present invention.

Another difference between a traditional payment card number and a one-time payment card number is the way that a given transaction using either number is validated by a verification agency, which may be a money source or an entity who processes payment card transactions. When a transaction involving a one-time payment card number is processed, the verification agency must verify that the one-time payment card number is valid for the user identifier for the particular given transaction, as opposed to any given transaction involving the user identifier. (The verification process may also have to take into account how selection of a customization parameter may affect what the verification agency will receive for verification. Details regarding use of a customization variable are set forth in U.S. Ser. No. 09/667,038. Additional details regarding procedures that can be used to verify a one-time card number that can be customized are set forth in U.S. Pat. No. 6,592,044.) This difference is a reason why use of the one-time payment card number provides greater security and anonymity than can be obtained through use of a traditional payment card.

A card number generator generates a one-time payment card number. As already described, this could be hardware or software, but, in either case, it will preferably include a customer random number generator and a customer sequence number. It is especially preferred that the card number generator be part of an electronic card, and that the electronic card be of the type described in U.S. application Ser. No. 09/571,707 filed May 15, 2000 for Anonymous Electronic Card for Generating Personal Coupons Useful in Commercial and Security Transactions, or in U.S. application Ser. No. 09/667,835.

Several different methods that can be used to generate a one-time payment card number are described in detail in the applications that are identified in the Cross Reference to Related Applications above, and which are incorporated herein by reference, so the details of those methods will not be repeated here. No matter what method is used to generate a one-time payment card number, two successive one-time payment card numbers should be different. This can be accomplished by using a sequence number that is changed after each one-time payment card number is generated. (The present invention does not require that all theoretical possibilities will result in different one-time payment card numbers. Instead, it is preferred that there be a low probability of occurrence of identical one-time payment card numbers attributable to convergence of two different inputs leading to the same result due to operations performed on the inputs by the algorithm.)

Use of a one-time payment card number can be customized in a number of different ways, as is explained in U.S. Ser. No. 09/667,038. By using a customization parameter, use of a one-time payment card number can be customized for a desired delivery method, as will now be explained.

When a user purchases certain goods or services, the delivery or availability of such goods or services can be immediate and made at the time and point of purchase, and therefore can be anonymous. Examples of this include use of a payment card in a face-to-face transaction at a check out counter or use of a payment card to obtain immediate access to something, such as a service, information or a software program, that is delivered telephonically or over a computer network. In such situations, the user may not be required to provide the merchant with a user address. However, even if an address is required, it need not be used for delivery, so it need not be an actual address of the user or an address for delivery of goods. Accordingly, in such situations, the user might want to provide a meaningless address to avoid undesired solicitation and junk mail, or an address of somebody who screens anything received at the address. Such an address could be a Proxy Agent.

When a user purchases goods that have to be delivered, the user is traditionally faced with a dilemma. Before the goods can be delivered, the user has to provide an address for delivery. If a home address is used, so the goods can be conveniently delivered to the home, anonymity is sacrificed. Once a merchant or marketer has a home address, the address is available for solicitation and, unfortunately for many consumers, junk mail. In addition, once a merchant or marketeer has a home address, it can be cross-referenced against available data bases, which can often reveal the true identity of the user, even if the transaction was otherwise conducted anonymously through use of a one-time payment card number and a fictitious user name. Once a true identity is obtained, that identity can be matched with the purchase, and this information can be used for all sorts of marketing purposes, including telemarketing. As is readily apparent, use of a real home address, even with an otherwise anonymous payment transaction, can lead to significant loss of a user's privacy and unwanted intrusions upon such privacy by a variety of marketing methods and practices.

To avoid such loss of privacy, a user might request that the goods be delivered to an address other than the user's home address, such as a work address or an address used for delivery of mail, such as a post office box. However, this option eliminates the convenience of a home delivery, and creates additional inconvenience. It is also not an option if the user making the purchase wants the goods sent to a third party, such as a relative, for a birthday or a holiday gift. This problem is aggravated when the desired delivery date is crucial and there is not sufficient time for delivery to a secondary address, and then a second delivery to the intended recipient. (In addition, this would involve extra cost and inconvenience associated with receiving the shipment at the secondary address, and then resending the package to the desired recipient.)

Even when a user is willing and able to put up with the inconvenience of delivery to a secondary address, there may be additional drawbacks with such a delivery.

The user may not want some goods delivered to the user's work address for a variety of reasons, including a resultant loss of privacy associated with such delivery. Not only may the user want to prevent colleagues from knowing what the user has purchased, but delivery to a work address may lead to junk mail being sent to the work address, or correlating the work address, in one fashion or another, to the true identity of the user. For example, assume that the user uses a fictitious name and a work address. The delivery agent may require proof that the user is entitled to receive the goods, and this proof could compromise the user's true identity. Alternatively, the user might not be able to claim goods delivered to the user's work address, or such goods, even if they have been delivered to the work address, may not reach the user due, for example, to theft by another employee.

Although delivery to an address designated for pick-up may avoid some of the problems associated with delivery to a work address, it has other drawbacks. For example, it requires that the user have an account with the delivery address, and pay for this service. In addition, it does not prevent the address from being used for junk mail. And, unless the user is careful with use of the address, and the service guarantees anonymity, it might still be possible for marketeers to use a database to cross-reference the delivery address to develop the true identity or address of the user.

To avoid the foregoing problems, the preferred embodiment of the present invention allows a user to select an anonymous delivery option when a one-time card number is used with a user identifier to complete a given commercial transaction. The mechanics of the anonymous delivery option can be triggered by use of a customization parameter associated with the anonymous delivery option. The customization parameter can be any of the customization parameters identified in U.S. Ser. No. 09/667,038. By selection of an appropriate customization parameter, a user can select from a variety of different, anonymous delivery options. For example, one option might be home delivery. Another option might be a pick-up by the user at a specified address. Another option might be a handling option by which the user selects a preselected delivery address. Still another option might be an alternative handling option by which the user provides a specified one-time delivery address for the specific transaction, and this might be provided before or after the actual transaction is completed with a merchant.

Once the anonymous delivery option is triggered, it can be implemented as follows.

When the commercial transaction is completed, whether it is a face-to-face transaction or a MOTO transaction, the user will provide the merchant with a one-time payment card number and a user identifier. As already noted, the user can customize the one-time payment card number so as to select the desired delivery method and address. Or, alternatively, the merchant could specify who the delivery agent will be, such as Federal Express® or UPS®, and the user could still specify a delivery option for such a carrier by selection of an appropriate customization variable. Once the merchant receives this information, it is sent to a money source to confirm the validity of the transaction. The communication from the merchant to the money source will also include an identification of the merchant and the amount of the transaction, and will also typically include the date of the transaction. When the money source confirms the validity of the transaction, the money source will send the merchant a confirmation number that can be used to identify the transaction. In other words, so far, this transaction proceeds in the same fashion as an ordinary credit card transaction, except that the merchant does not yet have a delivery address for the goods.

The delivery address can be provided to the delivery agent in a number of ways without allowing the merchant to learn the delivery address.

One way the delivery address can be kept from the merchant is for the money source to provide the delivery address to the delivery agent along with a tracking identifier. The money source can also give the tracking identifier to the merchant, so that it can serve as an identifier for the shipping process. The tracking identifier might simply be the confirmation number that the money source gave the merchant to confirm validation of the commercial transaction, or it might be another number specifically designated for this purpose. Once the merchant has the tracking identifier, the goods can be delivered to the delivery agent with the tracking identifier taking the place of a delivery address.

After the delivery agent receives the goods, the tracking identifier can be used to access the delivery address. Now the delivery agent to the delivery address can deliver the goods, and the delivery agent need not have any information about the addressee. To confirm delivery, and to verify that delivery has been made to the right party, the delivery agent can be given a delivery code. This might be information about the commercial transaction, such as a merchant invoice number or the one-time payment card number used to complete the transaction, but it is preferably a separate code that the merchant, and the merchant's employees, would not have access to. The delivery code can be generated by the delivery agent or the money source, or even the user, as long as it is known by the delivery agent and the person who will pick up the goods, who will be designated the "addressee" (the addressee may be the user or a third party). By using the money source or another source as an intermediary, there need not be any direct contact between the delivery agent and the addressee until the time of delivery.

Another way the delivery address can be kept from the merchant is to use two delivery agents, or to deliver the goods to a destination address where the purchased item is held at a pick-up location for pick-up by the addressee. For example, the goods could be delivered to a local office of the delivery agent. In both of these cases, the first delivery agent will not have an address of the addressee, and the merchant could not get such an address from the first delivery agent. A variant on this method of delivery is to segregate knowledge of the delivery address within the delivery agent. For example, the delivery agent might use an internal delivery address for the first point of delivery. This might be a central location where a number of packages from a given collection zone are collected for sorting and subsequent distribution. Once the goods reach this central address, they could be processed according to special procedures to limit access to the correlation between the tracking identifier and the delivery address.

If the goods are not to be shipped by use of a delivery agent, but held for pick-up by the user or an authorized agent of the user, the delivery process can be modified in a number of ways to safeguard anonymity, while still providing security against fraud. For example, the money source can send a delivery code to the user and the merchant that the user must have at the time of pick-up. The user can also be required to provide an additional verification of identity, albeit anonymous to the merchant, at the time of pick-up. One way to do this is to require the user to provide a valid one-time payment card number at the time of pick-up, and it is especially preferred that this number be a dummy number that is designated as such by using a customization variable designated as a dummy variable. When the dummy one-time payment card number is submitted for verification, the dummy variable tells the money source that this is not a commercial transaction, but rather, a request for verification of valid identity, and that it should be treated as such. Thus, the money source can use the dummy one-time payment card number to confirm that the person picking up the goods is authorized to pick them up, and then send a confirmation of the transaction to the merchant to verify that the party presenting the dummy one-time payment card number should be allowed to pick-up the goods. This confirmation also creates a record of receipt of the goods by the user. And, of course, all of these same methods could also be applied, if desired, to the situation of a delivery by the delivery agent to a delivery address.

In an alternative embodiment, the methods for anonymous delivery can be used to implement an anonymous "charge on delivery" that is somewhat akin to the concept of cash on delivery. In this embodiment, the money source can put a hold on charging or debiting the user's account (and, if desired, paying the merchant), until there has been an actual delivery of the goods. One way to establish such delivery is through use of a "dummy" one-time payment card number.

As described above, at least four parties are involved in completing an anonymous delivery of goods when the user does not pick up the goods from the merchant. In an alternative embodiment of the present invention, a fifth party is deliberately placed into the loop as an intermediary to act as a further safeguard against loss of anonymity. The fifth party, which shall be referred to as "Privacy Systems," can function as a further buffer and safeguard of the user's privacy. Using Privacy Systems as a payor to the merchant, a payee to the money source and the clearinghouse for all of the details of a given transaction, including the delivery address, does this. By adding this fifth party, who might be legally obligated not to divulge preselected details of a given transaction to third parties without consent of the user, the money source is taken out of the loop as a coordinating party with knowledge of all of the transaction details. Privacy Systems can also function as a clearinghouse for collecting, categorizing, marketing and selling information about transactions in which it is serving as an intermediary.

Although the foregoing detailed description is illustrative of preferred embodiments of the present invention, it is to be understood that additional embodiments thereof will be obvious to those skilled in the art. Further modifications are also possible in alternative embodiments without departing from the inventive concept.

Accordingly, it will be readily apparent to those skilled in the art that still further changes and modifications in the actual concepts described herein can readily be made without departing from the spirit and scope of the disclosed inventions as defined by the following claims.

What is claimed is:

1. A method for providing a secure and anonymous transaction between a user and a merchant with subsequent delivery of a purchased item, comprising the steps of:
   (1) establishing a user account between a money source and the user which is associated with a fictitious user identifier, a user account number, and a user settlement mechanism through which the user and the money source can settle payment card transactions involving the user account;
   (2) providing the user with a card number generator;
   (3) completing a payment card transaction between the user and the merchant in which the user account is charged a monetary value for the purchased item, comprising the following steps:
      (a) allowing the user to select a customization parameter associated with an anonymous delivery option for subsequent delivery of the purchased item to customize the payment card transaction by at least one of the following steps:
         (i) customizing generation of a user one-time payment card Number;
         (ii) customizing the fictitious user identifier; or
         (iii) inclusion of a customization variable in a user transaction data packet that includes the user one-time payment card number and the fictitious user identifier;
      (b) generating the user one-time payment card number through use of the card number generator; and
      (c) providing the merchant with the user transaction data packet;
   (4) submitting a merchant transaction data packet to the money source, wherein the merchant transaction data packet includes the user transaction data packet, the monetary value, a merchant identifier and a purchased item identifier;
   (5) providing the merchant with a confirmation that the transaction is valid after the money source verifies that the user one-time payment card number is valid for the fictitious user identifier and the transaction;
   (6) sending a tracking identifier from the money source to the merchant
   (7) sending the tracking identifier and a delivery address from the money source to a delivery agent;
   (8) invoking the settlement mechanism to charge or debit the user account for a transaction amount correlated to the monetary value;
   (9) delivering the purchased item to the delivery agent with the tracking identifier; and
   (10) delivering the purchased item from the delivery agent to the delivery address.

2. A method as recited in claim 1, wherein the merchant is not provided with the delivery address.

3. A method as recited in claim 1, wherein the confirmation is the tracking identifier.

4. A method as recited in claim 1, comprising the further steps of:
   (11) requiring an addressee to establish entitlement to delivery of the purchased item; and
   (12) delivering the purchased item to the addressee.

5. A method as recited in claim 4, wherein the addressee establishes entitlement to delivery of the purchased item by providing the delivery agent with a delivery code.

6. A method as recited in claim 4, wherein the address establishes entitlement to delivery of the purchased item by providing a dummy one-time payment card number that is verified as being valid by the money source.

7. A method as recited in claim 4, wherein the user in association with selection of the customization parameter provides the delivery address.

8. A method as recited in claim 7, wherein the delivery address is provided by the user to the money source after the merchant is provided with the user transaction data packet.

9. A method as recited in claim 1, comprising the further steps of:
   (11) delivering the purchased item from the delivery agent to a second delivery agent at the delivery address;
   (12) providing the second delivery agent with a second delivery address; and
   (13) delivering the purchased item to the second delivery address.

10. A method as recited in claim 9, comprising the further steps of:
- (14) requiring an addressee to establish entitlement to delivery of the purchased item; and
- (15) delivering the purchased item to the addressee.

11. A method as recited in claim 10, wherein the addressee establishes entitlement to delivery of the purchased item by providing the delivery agent with a delivery code.

12. A method as recited in claim 10, wherein the address establishes entitlement to delivery of the purchased item by providing a dummy one-time payment card number that is verified as being valid by the money source.

13. A method as recited in claim 11, wherein the user in association with selection of the customization parameter provides the delivery address.

14. A method as recited in claim 13, wherein the delivery address is provided by the user to the money source after the merchant is provided with the user transaction data packet.

15. A method as recited in claim 10, wherein the money source provides the second delivery agent with a second delivery address.

16. A method as recited in claim 10, wherein a Privacy Systems provides the second delivery agent with a second delivery address.

17. A method as recited in claim 1, wherein the delivery address is a destination address where the purchased item is held at a pick-up location.

18. A method as recited in claim 17, comprising the further steps of:
- (11) providing the user with the pick-up location; and
- (12) requiring an addressee to establish entitlement to delivery of the purchased item; and
- (13) delivering the purchased item to the addressee at the pick-up location after the addressee establishes entitlement to delivery of the purchased item.

19. A method as recited in claim 18, wherein the addressee establishes entitlement to delivery of the purchased item by providing the delivery agent with a delivery code.

20. A method as recited in claim 18, wherein the addressee establishes entitlement to delivery of the purchased item by providing a dummy one-time payment card number that is verified as being valid by the money source.

21. A method as recited in claim 1, wherein step (8) is not invoked until the money source receives a dummy one-time payment card number indicating delivery of the purchased item to the address.

* * * * *